(12) United States Patent
Randolph et al.

(10) Patent No.: US 6,285,919 B1
(45) Date of Patent: Sep. 4, 2001

(54) ROBOTIC SYSTEM FOR RETRACTABLE TELEOPERATED ARM WITHIN ENCLOSED SHELL WITH CAPABILITY OF OPERATING WITHIN A CONFINED SPACE

(75) Inventors: John David Randolph, Maryville; Peter Downes Lloyd; Lonnie Joe Love, both of Knoxville, all of TN (US); Dong Soo Kwon, Taejon (KR); James Allen Blank, Knoxville, TN (US); Hurley Thomas Davis, Dublin, OH (US)

(73) Assignee: U T Battelle, LLC, Oak Ridge, TN (US)

( * ) Notice: Subject to any disclaimer, the term of this patent is extended or adjusted under 35 U.S.C. 154(b) by 0 days.

(21) Appl. No.: 09/111,017

(22) Filed: Jul. 7, 1998

(51) Int. Cl.⁷ .............................. G06F 19/00; G01M 1/38; B25J 9/18; G05B 19/19
(52) U.S. Cl. .................... 700/245; 700/245; 700/275; 318/568.11
(58) Field of Search ..................................... 700/243, 245, 700/275, 247, 250; 137/13, 15; 318/568.11

(56) References Cited

U.S. PATENT DOCUMENTS

| | | |
|---|---|---|
| 4,149,934 * | 4/1979 | Jacobs et al. ........................ 376/249 |
| 4,351,478 | 9/1982 | Looper . |
| 4,594,049 * | 6/1986 | Terauchi ............................. 414/744.5 |
| 4,889,197 * | 12/1989 | Boe ...................................... 175/267 |
| 4,962,338 | 10/1990 | Daggett et al. . |
| 4,976,278 * | 12/1990 | Ripley et al. ........................... 137/15 |
| 5,085,242 * | 2/1992 | Ripley et al. ........................... 137/13 |
| 5,265,667 | 11/1993 | Lester, II et al. . |
| 5,355,063 * | 10/1994 | Boone et al. ................... 318/568.11 |
| 5,497,813 * | 3/1996 | Dinnis et al. ......................... 141/329 |
| 5,944,476 * | 8/1999 | Bacchi et al. ........................ 414/783 |
| 5,989,220 * | 11/1999 | Shaw et al. ........................... 604/110 |

* cited by examiner

Primary Examiner—Thomas Lee
Assistant Examiner—Chun Cao
(74) Attorney, Agent, or Firm—J. Herbert O'Toole; Hardaway/Mann IP Group (57) ABSTRACT

An apparatus for performing a task in a confined space having an access port. The apparatus comprise: a confinement box securable to the access port of the confined space; a shell extending from the confinement box; a teleoperated arm movable between a retracted position, in which the teleoperated arm is disposed within the shell, and a deployed position, in which the teleoperated arm extends through the access port and into the confined space to perform the task; and a control system for commanding the teleoperated arm. The arm links and joint connectors of the teleoperated arm assembly are the conduits for the process

24 Claims, 12 Drawing Sheets

ROBOTIC SYSTEM FOR RETRACTABLE TELEOPERATED ARM WITHIN ENCLOSED SHELL WITH CAPABILITY OF OPERATING WITHIN A CONFINED SPACE

STATEMENT AS TO RIGHTS TO INVENTIONS MADE UNDER FEDERALLY SPONSORED RESEARCH AND DEVELOPMENT

The U.S. Government has rights in this invention pursuant to contract number DE-AC05-96OR22464 between the Lockheed Martin Energy Research Corporation and the Department of Energy.

BACKGROUND OF THE INVENTION

The present invention relates generally to an apparatus with a teleoperated arm. Specifically, the present invention relates to an apparatus having a teleoperated arm that can perform a variety of tasks in a confined space.

Many difficulties arise when performing tasks within a confined space. For instance, several apparatuses and processes must be simultaneously controlled. In addition, the tool used to perform must be small enough to enter through access ports of limited size. The tool must also reach all necessary locations within the confined space. Despite their limited size, the tools are still required to perform the desired task properly.

When hazardous materials are present in the confined space, the difficulty of performing the task multiplies. Human intervention at the location of the hazardous material or within a confined space is obviously not recommended, or may be prohibited in certain circumstances. In these instances, robotic or teleoperated systems must be used.

Several attempts have been made to provide robotic or teleoperated systems that perform various tasks in confined and/or hazardous spaces. U.S. Pat. No. 4,351,478 to Looper discloses an apparatus for cleaning tanks. The apparatus includes a vertical member that enters the tank. The vertical member supports a wash nozzle assembly. An air motor drives two gear boxes to pivot the wash nozzle in two directions within the tank.

Also, U.S. Pat. No. 5,265,667 to Lester, II et al. discloses a robotic arm for servicing nuclear steam generators. The robotic arm includes a support beam securable to the manway of a steam generator. The support beam allows placement of an extension arm to a suitable position relative to heat exchanger tube in the steam generator in order to allow eddy current inspection of the tubes.

While certainly beneficial in their specific applications, previous attempts at a solution may not be suitable in other confined space situations. In addition, the previous attempts do not integrate the various apparatuses and processes involved in performing a task in a confined space. Clearly, there is room for improvement in the art.

SUMMARY OF THE INVENTION

Therefore, it is an object of the present invention to provide an improved apparatus with a teleoperated arm.

It is a further object of the present invention to provide an apparatus with a teleoperated arm used to perform a variety of tasks in a confined space.

It is a further object of the present invention to provide an apparatus with a teleoperated arm integrated with the processes involved in performing a variety of tasks in a confined space.

It is a further object of the present invention to provide an apparatus with a teleoperated arm that can perform a variety of task within a storage tank by accessing the storage tank through a single riser.

It is a further object of the present invention to provide an apparatus with a four degree of freedom teleoperated arm.

It is a further object of the present invention to provide a teleoperated arm assembly in which the conduits used to transport material for performing tasks within the confined space form the structure of the teleoperated arm.

It is a further object of the present invention to provide a control system that integrates the apparatuses with the processes involved in performing a given task in a confined space.

These and other objects are achieved in one aspect of the present invention by an apparatus for performing a task in a confined space having an access port. The apparatus comprises: a confinement box securable to the access port of the confined space; a shell extending from the confinement box; a teleoperated arm movable between a retracted position, in which the teleoperated arm is disposed within the shell, and a deployed position, in which the teleoperated arm extends through the access port and into the confined space to perform the task; and a control system for commanding the teleoperated arm.

These and other objects are achieved in a second aspect of the present invention by the apparatus comprising: a confinement box; an elongated tube connected to an aperture in an upper end of a main compartment of the confinement box; a teleoperated arm; and a control system operatively connected to the confinement box and teleoperated arm for manipulating the apparatus. The confinement box includes: an aperture at an upper end and an aperture at a lower end securable to the access port of the confined space; a height adjustable table including: a motor for raising and lower the table; a rotatable flange; and a motor for rotating the flange. The teleoperated arm includes: a mast movable within the tube and the confinement box; an inner arm comprising a conduit; a shoulder joint connecting the mast and inner arm, the inner arm being in fluid communication with at least one conduit; a means for actuating the shoulder joint; an outer arm comprising a conduit; an elbow joint connecting the outer arm and inner arm, the outer arm being in fluid communication with the inner arm; and a means for actuating the elbow joint. The mast secures to the rotatable flange and has at least one conduit extending therethrough.

These and other objects are achieved in a third aspect of the present invention by a teleoperated arm assembly, comprising: a first section; a means for translating the first section; a means for rotating the first section; a second section; a shoulder joint connecting the first and second sections; a means for actuating the shoulder joint; a third section; an elbow joint connecting the second and third sections; a means for actuating the elbow joint; and a control system commanding the first section translating means, first section rotating means, shoulder joint actuating means and elbow joint actuating means.

These and other objects are achieved in a fourth aspect of the present invention by a teleoperated arm assembly in which the arm links serve as process conduits integral to the teleoperated arm for the purpose of transporting extractable material from a confined space and/or for the purpose of supplying a process stream or electrical utility to the confined space.

BRIEF DESCRIPTION OF THE DRAWINGS

The features of the present invention will become apparent to those skilled in the art to which the present invention relates from reading the following specification with reference to the accompanying in which.

DETAILED DESCRIPTION OF THE REFERRED EMBODIMENTS

FIGS. 1–12 demonstrate one preferred embodiment of the apparatus of the present invention. Apparatus 1 is part of an overall system S that performs a task within a confined space. In the preferred embodiment, apparatus 1 performs a task within an underground storage tank T. Tank T may require system S, including apparatus 1, to perform one or more processes within tank T. The processes can include, for example, waste dislodging, scarification, sludge retrieval and sluicing.

Figure 1:
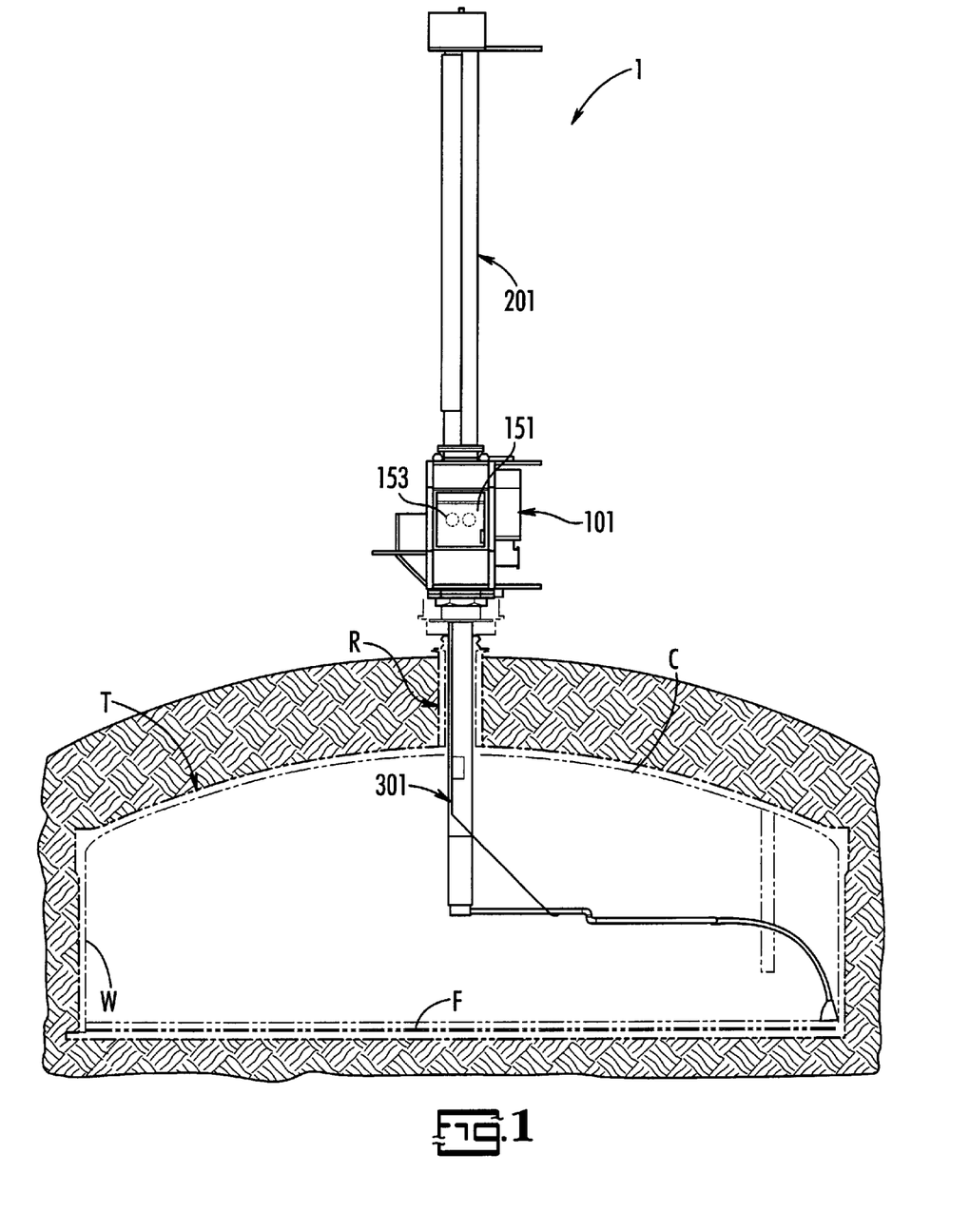
FIG. 1 is a perspective view of the apparatus of the present invention performing a task within an underground storage tank.

As with most underground storage tanks, tank T includes walls W, floor F, dome C and at least one riser R. Risers R provide the only access ports to the interior of underground storage tank T. In a fifty (50) foot diameter tank, the riser may only be two (2) feet in diameter. Apparatus 1 is designed to enter tank T through riser R.

As stated above, apparatus 1 is part of an overall system S that performs tasks within tank T. Aside from apparatus 1, system S can include, for example, pipes (not shown), hoses (not shown), cables (not shown) and valves (not shown) that supply the necessary materials and/or utilities to apparatus 1 and, possibly, to other apparatuses in system S to perform a task in tank T, and to remove the byproducts that may have been created during performance of the task in tank T.

Apparatus 1 includes several interrelated components, including a confinement box assembly 101, tube assembly 201, teleoperated arm assembly 301, and control system 401. Apparatus 1, using control system 401, integrates confinement box assembly 101, tube assembly 201, and especially teleoperated arm assembly 301 with the processes of system S. Each of the components of apparatus 1 will now be individually described in greater detail below.

Confinement Box Assembly

FIGS. 2–5 demonstrate a preferred embodiment of confinement box assembly 101. Confinement box assembly 101 is an enclosure formed of frame members 103 and body panels 105. An interface pipe connector 107 extends from the bottom portion of confinement box assembly 101. Confinement box assembly 101 secures to riser R (or a decontamination spray ring (not shown)) by mating a flange 109 on pipe 107 to riser R (or the decontamination spray ring).

Figure 2:
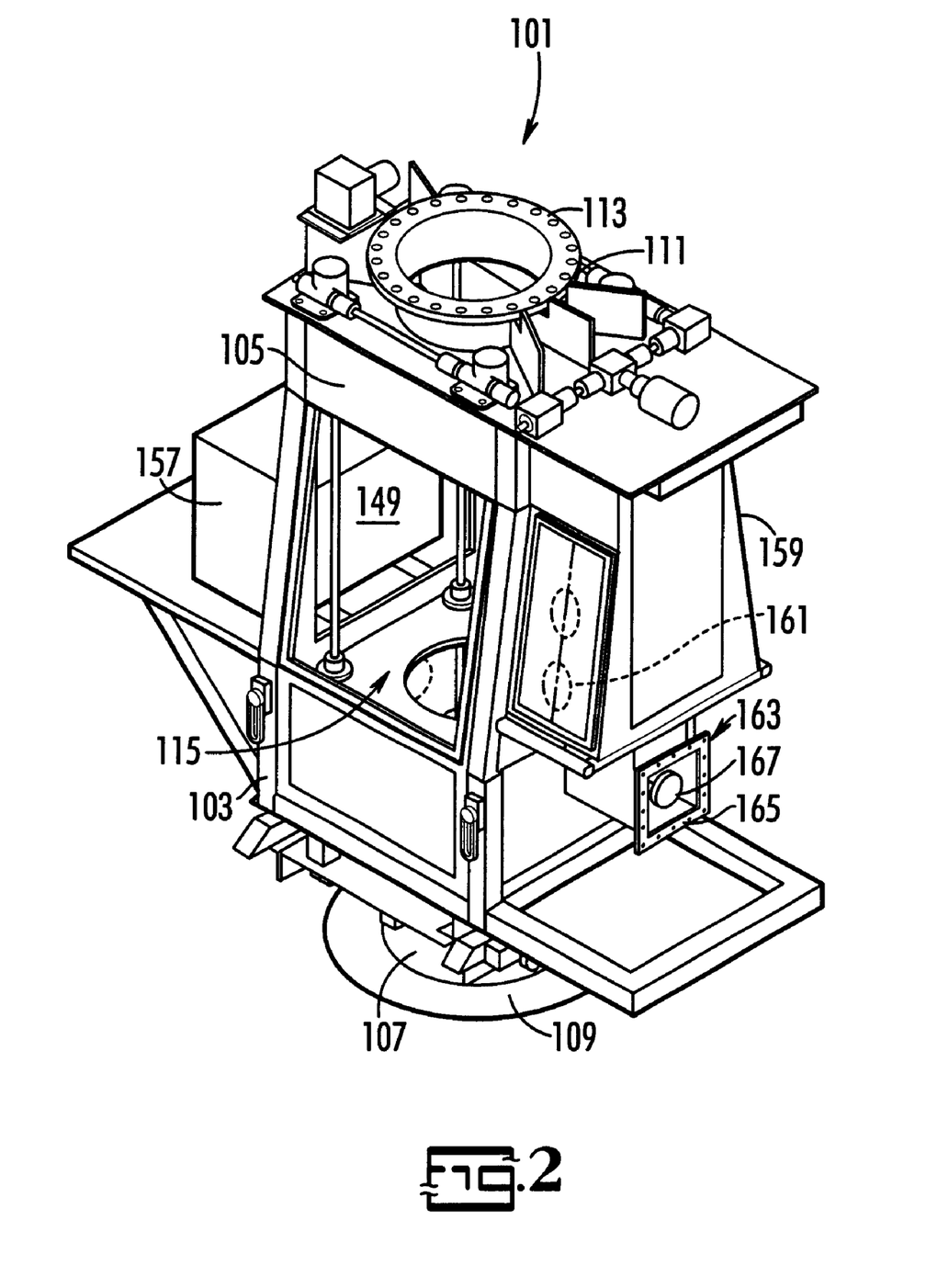
FIG. 2 is a perspective view of the containment box assembly of the present invention.

Similarly, a pipe 111 extends from the upper portion of confinement box assembly 101. A flange 113 on pipe 111 mates with a flange 205 on tube assembly 201 described in more detail below. Once secured to riser R and once tube assembly 201 mates with flange 113, apparatus 1 is a sealed system with tank T. In other words, confinement box assembly 101 and tube assembly 201 enclose the hazardous environment within tank T. If needed, a blind flange (not shown) can mount to flange 113 to cap pipe 111. The blind flange seals the hazardous environment within tank T and confinement box assembly 101 when tube assembly 201 is not secured to confinement box assembly 101. To install tube assembly 201 to flange 113, the blind flange is simply removed from flange 113.

An X-Y positioning table 117 secures to the bottom of confinement box assembly 101. X-Y positioning table 117 is used to precisely center mast 303 over riser R. X-Y positioning table 117 rests on existing steel beams (shown in phantom in FIG. 1) positioned around riser R to seat confinement box assembly 101 over tank T.

Figure 3:
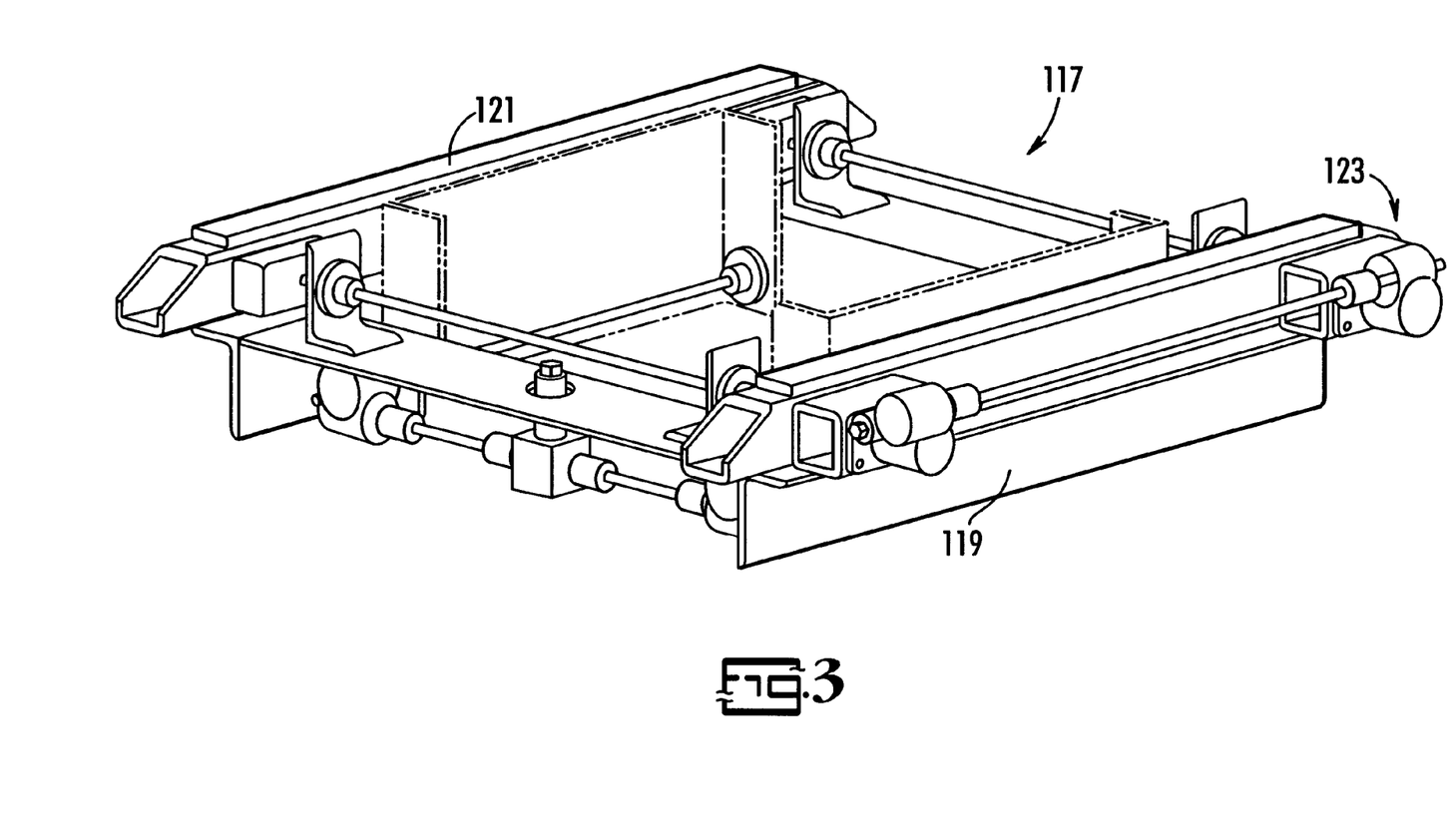
FIG. 3 is a perspective view of the X-Y positioning table of the containment box assembly shown in FIG. 2.

As seen in FIG. 3, X-Y positioning table 117 includes lower frame members 119 which rest upon the steel beams around riser R. Upper frame members 121 are movably positioned on lower frame members 119. Manually driven ball screw units 123 translate upper frame members 121 in two orthogonal directions relative to lower frame members 119. Upper frame members 121 secure to the bottom of confinement box assembly 101. This allows the precise positioning of mast 303 with the center of riser R.

Confinement box assembly 101 has three compartments. Main compartment 115 occupies the middle of confinement box assembly 101 and extends between pipe 107 on the lower portion and pipe 111 on the upper portion. Main compartment 115 has an opening 149 housing a transparent panel 151 (see FIG. 1). Transparent panel 151 includes glove porting 153 to allow an operator to perform tasks within confinement box assembly 101. For instance, the operator would use glove portion to secure the conduits from a jumper panel (not shown) in confinement box assembly 101 to fittings 315 on a circular plate 309 of mast 303.

Main compartment 115 allows passage of a mast 303 of teleoperated arm assembly 301. When in a retracted position, teleoperated arm assembly 301 preferably resides entirely within tube assembly. When in an extended position, a portion of teleoperated arm assembly 301 preferably resides within confinement box and a portion within tank T.

Figure 4:
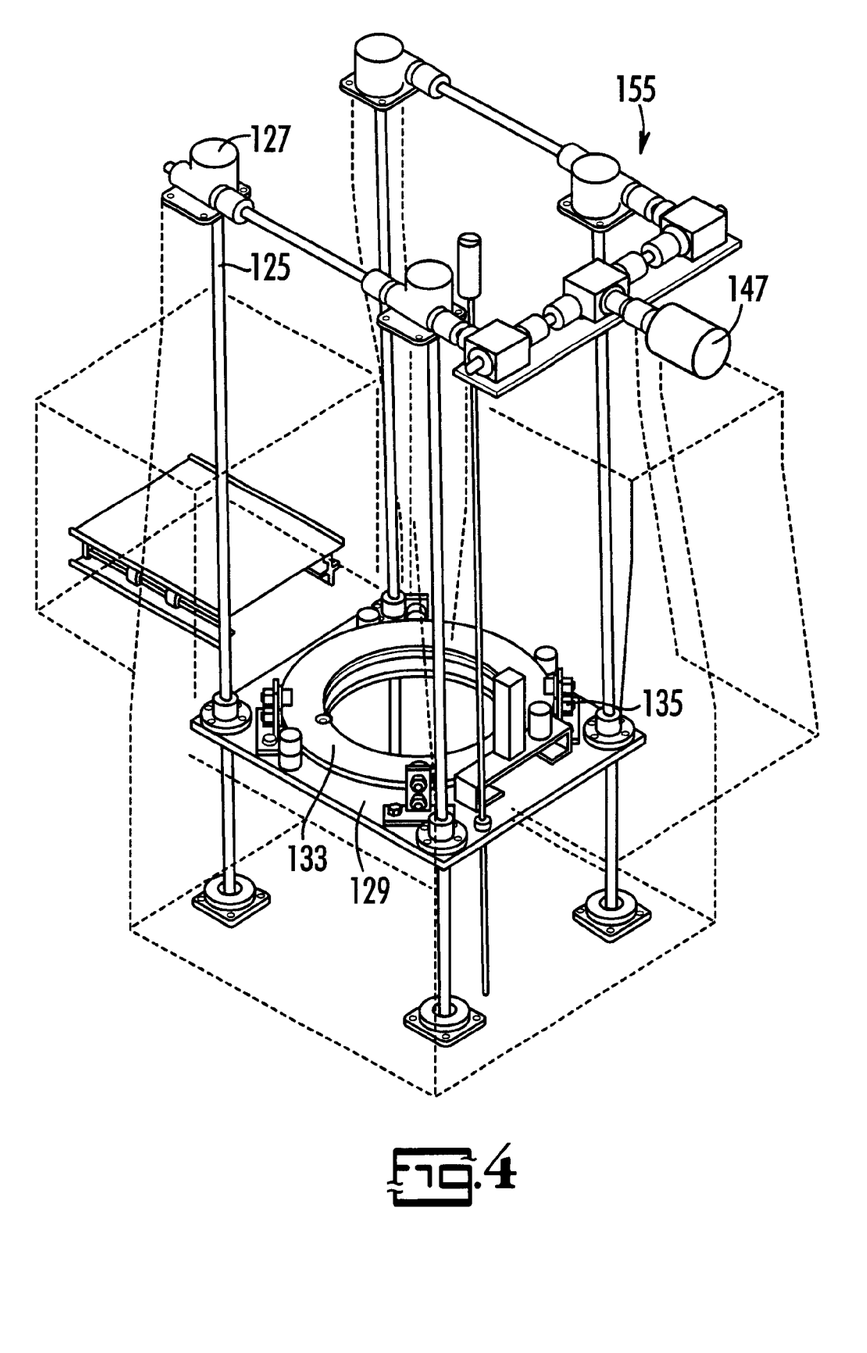
FIG. 4 is a perspective view of the mast elevate table of the containment box assembly shown in FIG. 2.

A mast elevate table 155 resides within main compartment 115 and can raise or lower mast 303 during operations within tank T. Table 155 includes a rectangular plate 129. Circular plate 309 of mast 303 rests on table 155. Four actuator screws 125 support rectangular plate 129. Screw actuators 127, driven by a motor 147, rotate screws 125.

Motor 147 can be, for example, a Baldor 1/2 HP, three phase, 1725 rpm actuator drive motor. Rotation of screws 125 in one direction causes rectangular plate 129 and mast 303 to elevate. Rotation of screws 125 in the opposite direction causes rectangular plate 129 and mast 303 to lower.

Figure 5:
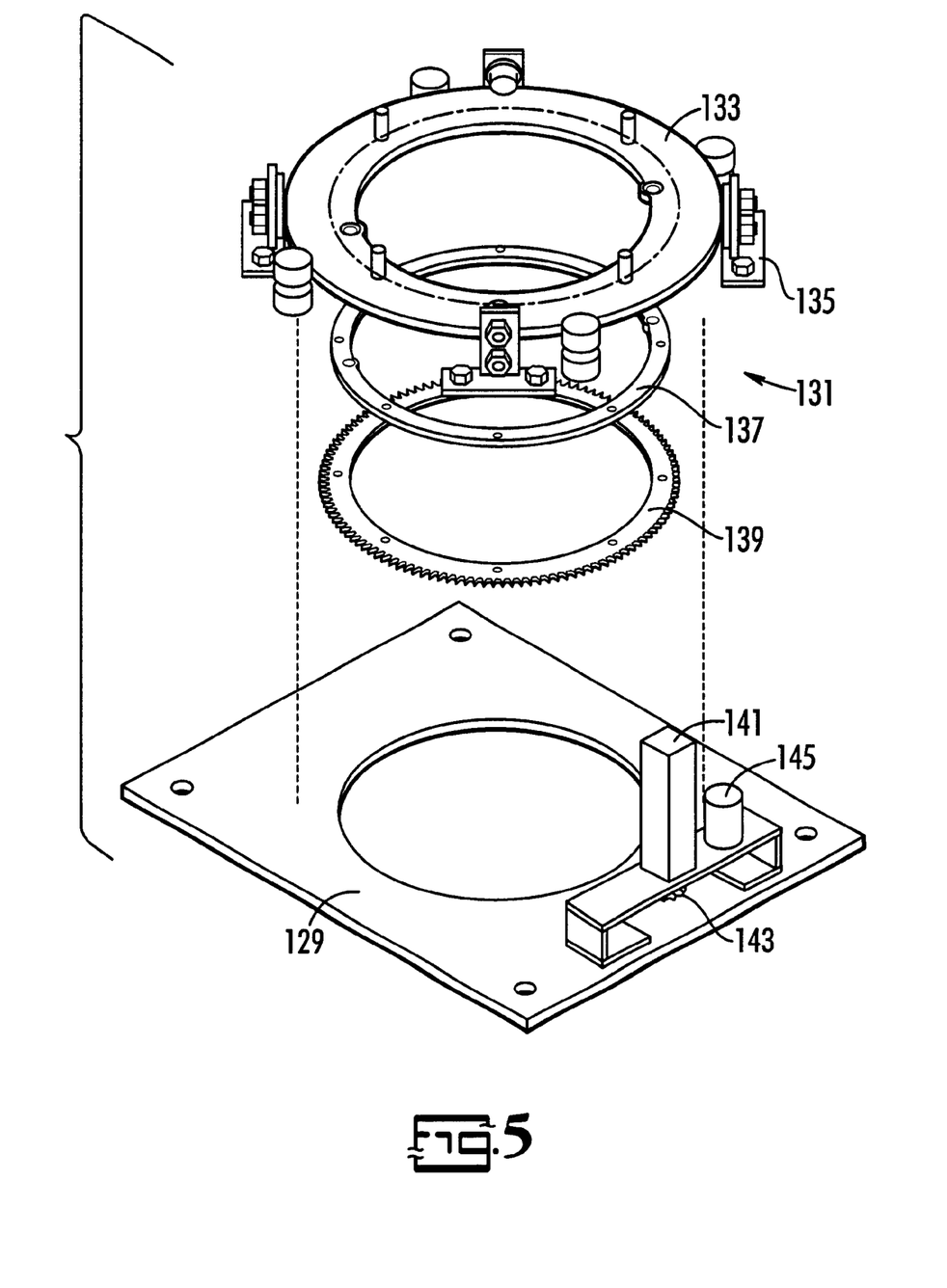
FIG. 5 is a perspective view of the mast rotate assembly of the containment box assembly shown in FIG. 2.

A mast rotate assembly 131 mounts to mast elevate table 155. Mast rotate assembly 131 secures to rectangular plate 129 and includes an annular plate 133 supported by bearings 135 mounted to rectangular plate 129. Circular plate 309 of mast 303 rests on annular plate 133. A spacer 137 secures to the lower surface of annular plate 133. A gear 139 secures to spacer 137.

A motor 141, having a gear 143, mounts to rectangular plate 129. Gear 143 meshes with gear 139 to allow rotation of annular plate 133. Motor 141 is, preferably, backdriveable. Control system 401 uses motor 141 and resolver 145 to provide servo control of plate 309.

Confinement box assembly 101 when connected to tank T is a sealed environment, isolated from the outside environment to prevent contamination. Accordingly, access to the interior of confinement box assembly 101 must be controlled. Confinement box assembly 101 uses a conventional pass-through compartment 157 having, for example, bag-in/bag-out capability to provide controlled access to the interior of confinement box assembly 101. As an example, the operator can use pass-through compartment 157 to insert a tool into the interior of confinement box assembly 101 for maintenance activities.

Confinement box assembly 101 also includes a conduit interaction compartment 159. All of the hoses and cabling of system S that connect to apparatus 1 must enter the sealed environment through conduit interaction compartment 159. Conduit interaction compartment 159 uses a transparent panel 161 with glove porting to allow the operator to connect the hoses and cabling to one side of a jumper panel (not shown) residing in conduit interaction compartment 159. The other side of jumper panel resides within main compartment 115 and allows connection of the hoses and cabling to their respective fittings 315 on conduits 317 in mast 303.

Conduit interaction compartment 159 preferably has a discharge port 163 separated from the remainder of conduit interaction compartment 159. Discharge port 163 has a flange 165 surrounding a discharge pipe 167. Discharge process piping (not shown) of system S secures to both flange 165 and discharge pipe 167. Discharge process piping receives the contents retrieved from tank T for subsequent treatment and/or disposal in any conventional manner.

Confinement box assembly 101 can include a decontamination wand (not shown) used to spray teleoperated arm assembly 301 when removed from tank T. System S provides the necessary hoses (not shown) and piping (not shown) to operate the decontamination wand.

Tube Assembly

Figure 6:
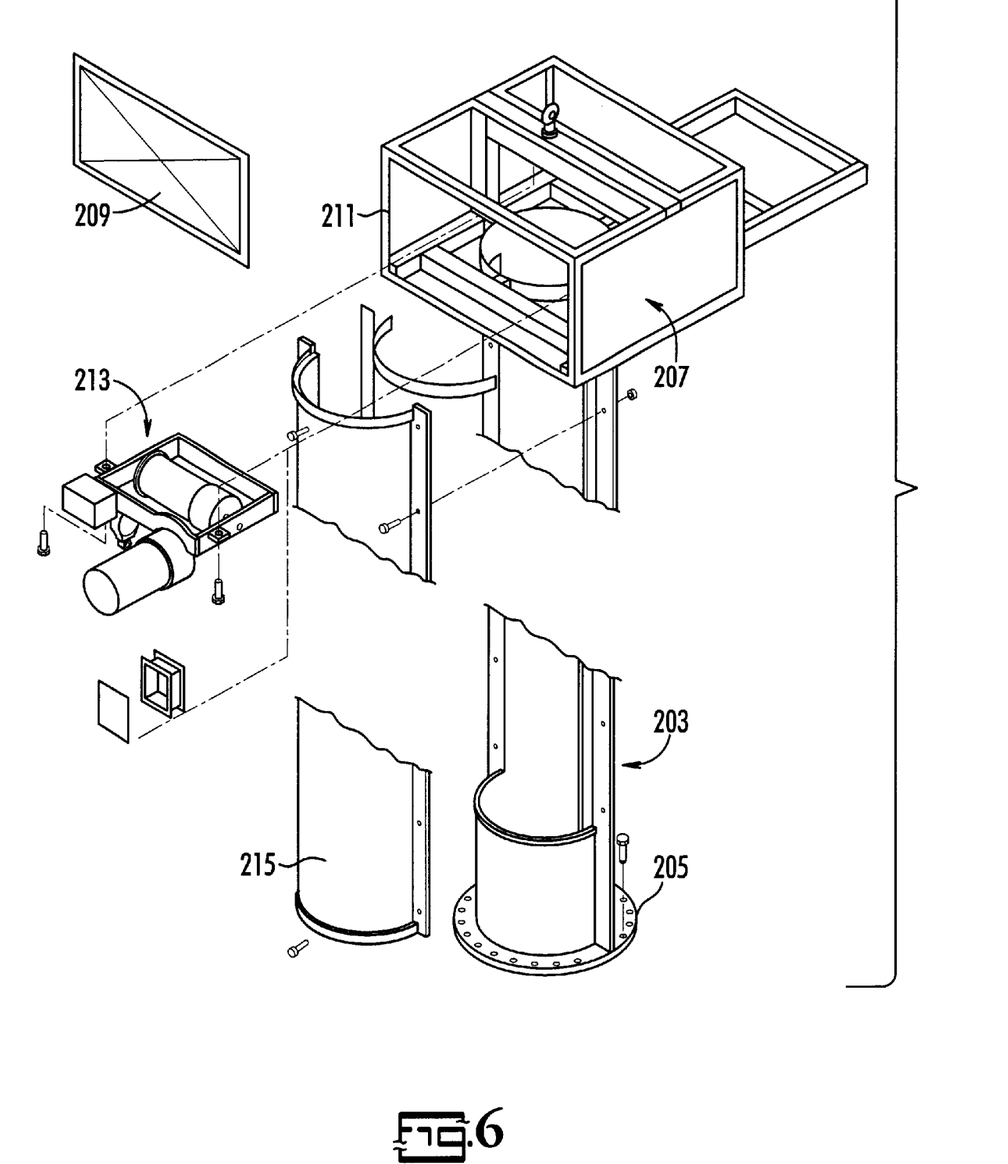
FIG. 6 is an exploded perspective view of the tube assembly of the present invention.

FIG. 6 demonstrates a preferred embodiment of tube assembly 201. Tube assembly 201 includes a cylindrical portion 203 having a flange 205 at a lower end and an enclosure 207 at an upper end. Flange 205 mates with flange 113 of confinement box assembly 101. Bolts, for example, extending through aligned apertures in flanges 205, 113 secure tube assembly 201 and confinement box assembly 101 together.

Enclosure 207 is formed by body panels 209 secured to frame members 211. A conventional hoist 213 secures to frame members 211. Hoist 213 moves teleoperated arm assembly 301 from a retracted position to a deployed position by attaching to eye bolt 313. Hoist 213 can, for example, have a three thousand (3000) pound capacity. In the extended position, a portion of teleoperated arm assembly 301 preferably resides within tank T. In the retracted position, teleoperated arm assembly 301 preferably resides within tube assembly 201.

Tube assembly 201 can have removable panels at any location in order to allow access to a component of apparatus 1 to allow, for example, maintenance or repair of the component. As an example, cylindrical portion 203 includes a removable panel 215. Removable panel 215 allows access to teleoperated arm assembly 301 when in the retracted position.

Teleoperated Arm Assembly

FIGS. 7–11 demonstrate a preferred embodiment of teleoperated arm assembly 301. Teleoperated arm assembly 301 has several sections, including a mast 303, an inner arm 305, and an outer arm 307. Although teleoperated arm assembly 301 can be designed to satisfy the needs of a particular application, preferably teleoperated arm assembly 301 has four (4) degrees of freedom to allow proper operation of system S within tank T. Preferably, two of the joints are backdriveable, while the others are non-backdriveable.

Figure 7:
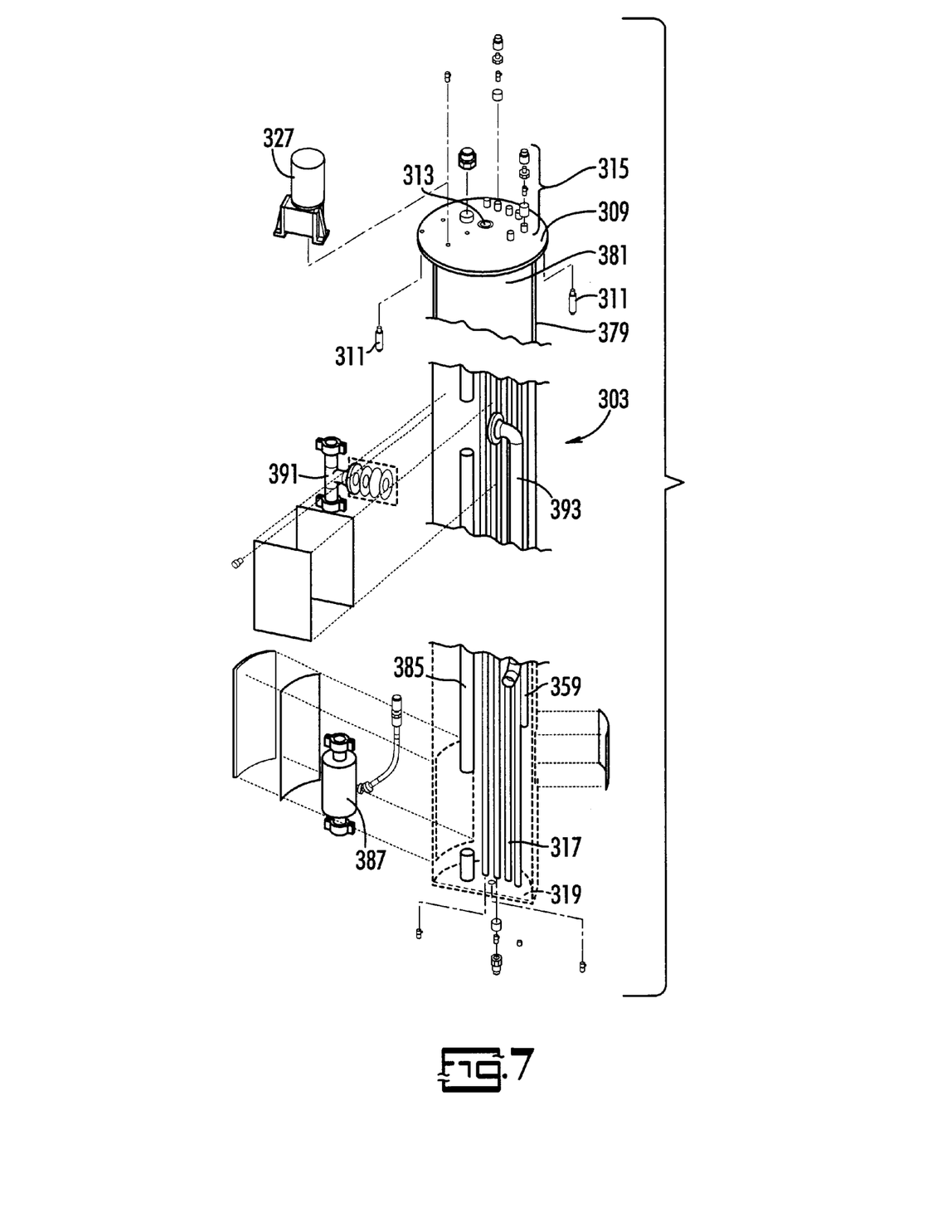
FIG. 7 is an exploded perspective view of the mast portion of the teleoperated arm assembly of the present invention.

Mast 303 has an elongated shell portion which includes a half pipe section 379 and a flat plate 381 extending between opposite ends of half pipe section 379. In other words, the elongated shell portion has a D-shaped cross-section. A circular plate 309 encloses the upper end of the elongated shell portion.

Circular plate 309 is the interface point between teleoperated arm assembly 301 and confinement box assembly 101. Two pins 311 extend from the lower surface of circular plate 309. Pins 311 correspond to apertures (not shown) on annular ring 133 of confinement box assembly 101. When pins 311 seat within the apertures, teleoperated arm assembly is properly positioned on mast elevate table 155 of confinement box assembly 101.

Circular plate 309 is also the interface point between teleoperated arm assembly 301 and tube assembly 201. Circular plate 309 has an eye bolt 313 fastened thereto. Eye bolt 313 receives a hook (not shown) or other fastener located at the end of a cable (not shown) extending from hoist 213 of tube assembly 201. Actuation of hoist 213 can either raise teleoperated arm assembly 301 to its retracted position or lower teleoperated arm assembly 301 to its deployed position. Teleoperated arm assembly 301 is in a retracted position when hoist 213 has raised teleoperated arm assembly 301 out of tank T. Teleoperated arm assembly 301 is in a deployed position when teleoperated arm assembly 301 seats on mast elevate table 155 of confinement box assembly 101 and extends into tank T.

Circular plate 309 also includes fittings 315 which allows connection between conduits 317 in mast 303 and the conduits (not shown) from the jumper panel. Conduits 317 can be, for example, pipes (e.g. high pressure water supply lines or suction lines), hoses or electrical cabling (e.g. control cables for the teleoperated arm actuator motors or the instrumentation). Fittings 315, therefore, are appropriate to the specific type of conduit 317.

A conventional hoist assembly 327 attaches to circular plate 309. Hoist assembly 327, using a cable (not shown) connected to inner arm 305 of teleoperated arm assembly 301, pitches inner arm 305 relative to mast 303 (the joint between inner arm 305 and mast 303 can also be referred to as a shoulder). Preferably, hoist assembly 327 pitches inner arm 305 to a perpendicular orientation relative to mast 303. By using hoist assembly 327, shoulder pitch is non-backdriveable. As a precaution, hoist assembly 327 can include a brake (not shown) to fix the position of inner arm 305 relative to mast 303.

Figure 8:
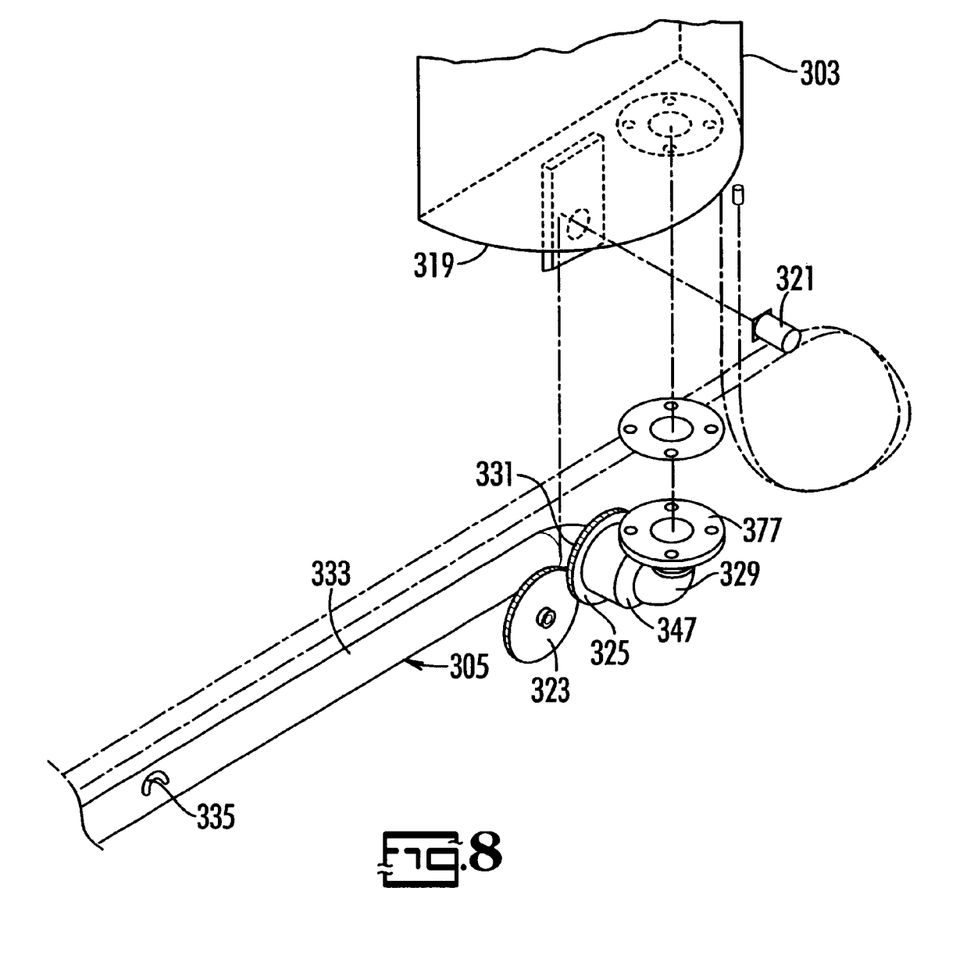
FIG. 8 is a perspective view of the shoulder joint between the mast and the inner arm of the teleoperated arm assembly of the present invention.

A D-shaped plate 319 encloses the lower end of the elongated shell portion. D-shaped plate 319 is the interface point between mast 303 and inner arm 305. A resolver 321 mounts to the bottom surface of D-shaped plate 319. Resolver 321, along with attached gear 323, interact with a gear 325 mounted to inner arm 305. Resolver 321, along with the other resolvers of apparatus 1, could be, for example, a Neotech series 2510 resolver with a 0.250" diameter shaft. Control system 401 uses resolver 321 to determine the position, or pitch, of inner arm 305 relative to mast 303 using conventional techniques.

Figure 9:
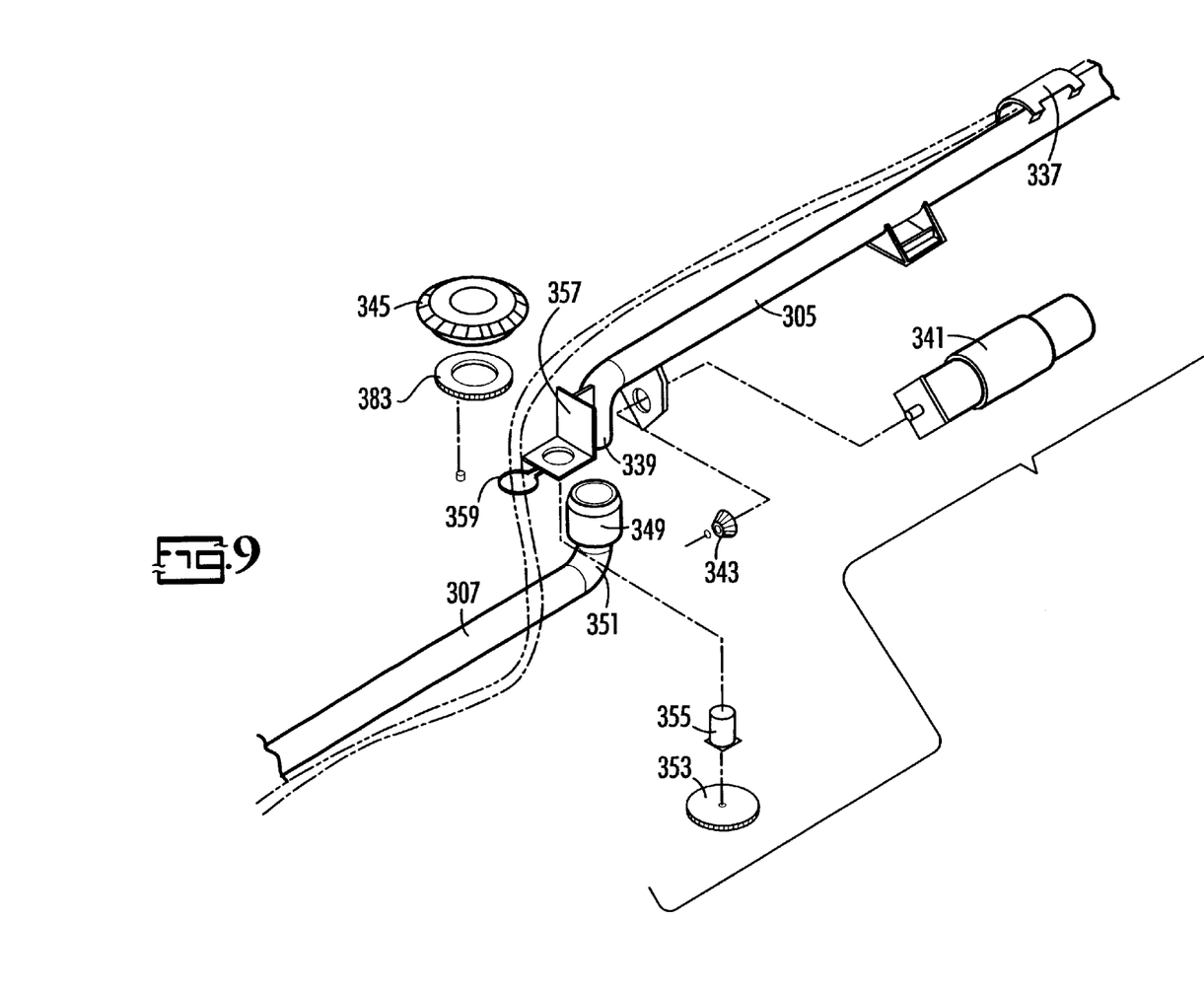
FIG. 9 is a perspective view of the elbow joint between the inner arm and the outer arm of the teleoperated arm assembly of the present invention.

The appropriate transmission ratio for each resolver depends on the gear ratios external to the resolver. As an example, mast rotate resolver 145 could have a 10:1 transmission ratio, shoulder resolver 321 could have a 1.5:1 transmission ratio, and elbow resolver 355 could have a 1:1 transmission ratio.

Inner arm 305 comprises various pipe sections and a pipe swivel, all preferably made of steel. Specifically, inner arm 305 includes an elbow 329, having a flange 377, that mates with the lower surface of D-shaped plate 319. Elbow 329 can be secured to D-shaped plate 319 using, for example, bolts (not shown). Elbow 329 connects to at least one of conduits 317 within mast 303. In the preferred embodiment, elbow 329 connects a suction line within mast 303. The external hoses or cabling connects to the remaining conduits 317 in mast 303.

Inner arm 305 also has a second elbow 331. To allow shoulder pivot, inner arm 305 uses a conventional rotatable pipe coupling 347 connecting elbows 329, 331. Pipe coupling 347 along with elbows 329, 331 form the shoulder joint. Rotatable pipe coupling 347 allows the pivotal movement of the shoulder joint. A gear 325 secures to the outer surface of pipe coupling 347. As discussed above, gear 325 interacts with resolver gear 323 to provide feedback to control system 401. All of the pipe sections and pipe swivels described herein, including pipe coupling 347 and elbows 329, 331 connect using known techniques.

Inner arm 305 also includes an elongated pipe 333. One end of elongated pipe 333 rigidly secures to second elbow 331. As clearly shown in FIGS. 8-10, discharge port 163 and teleoperated arm assembly 301 (including additional conduit section 369) serve as the primary conduit of system S for the retrieval and transport of tank contents (e.g. liquids, slurries and/or solids) during operations within tank T.

Pipe 333 has several attachments thereon. An eye 335 secures to the exterior surface of pipe 333. Eye 335 is the connection point for the cable (not shown) extending from hoist assembly 327 used for shoulder pitch. As hoist assembly unwinds the cable, inner arm 305 rotates from a retracted position parallel to mast 303 to an extended position, preferably perpendicular to mast 303.

Shielding 317 also secures to pipe 333. Shielding 337 allows any of the external hoses or cabling required to perform a task within tank T to pass between shielding 337 and pipe 333. Shielding 337 manages the hoses or cabling so as not to interfere with the joints of the teleoperated arm assembly 301 and protects the hoses or cabling when teleoperated arm assembly 301 is stowed.

A yaw drive motor 341 also secures to pipe 333. Motor 341 includes a bevel gear 343 which interacts with a bevel gear 345 on outer arm 307. Motor 341 rotates outer arm 307 relative to inner arm 305.

Inner arm 305 also includes a third elbow 339 rigidly secured to the distal end of pipe 333. Third elbow 339, along with the below-described coupling 349 and fourth elbow 351 form the elbow joint of teleoperated arm assembly 301. To allow elbow yaw, the elbow joint has a second conventional rotatable pipe coupling 349 secured to the distal end of third elbow 339. A fourth elbow 351 secures to the distal end of coupling 349.

Pipe coupling 349 has a bevel gear 345 and a gear 383 secured to an outer surface. Bevel gear 345 interacts with bevel gear 343 on motor 341. Motor 341 rotates fourth elbow 351 relative to third elbow 339. Motor 341 is preferably backdriveable.

Gear 383 interacts with a gear 353 connected to a resolver 355. Resolver 355 mounts to third elbow 339 using a bracket 357. Control system 401 determines the relative positions, or amount of yaw, between outer arm 307 and inner arm 305 using resolver 355. Similar to the function of shielding 337, bracket 357 also includes a guard 359 through which the external hoses or cabling travels. Guard 359 protects the external hoses or cabling from the elbow joint and the exposed gears, and also protects the hoses and cabling when teleoperated arm assembly 301 is stowed.

Figure 10:
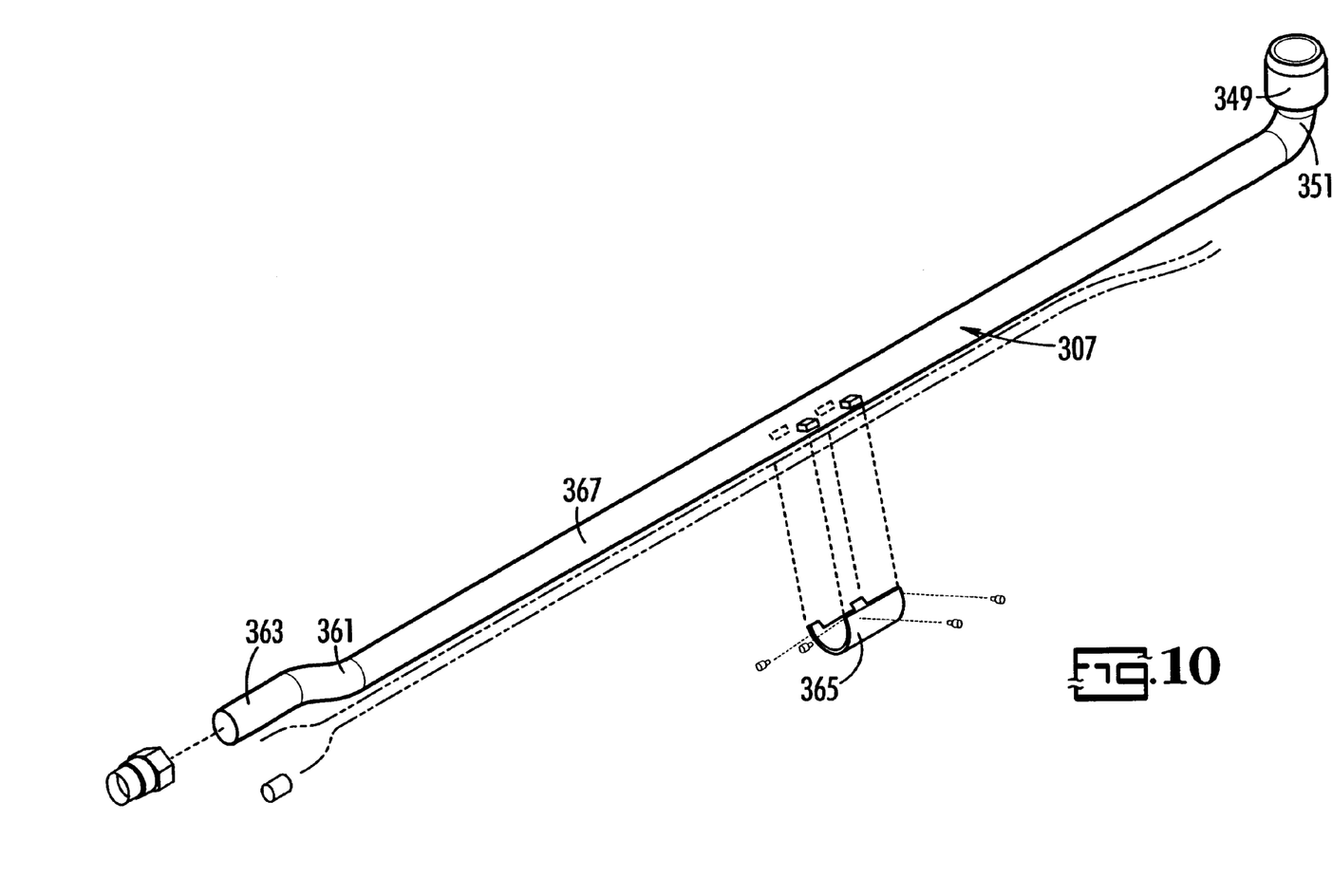
FIG. 10 is a perspective view of the outer arm of the teleoperated arm assembly of the present invention.

Outer arm 307 also comprises various pipe sections and a pipe swivel. Outer arm 307 rigidly secures to the distal end of fourth elbow 351. Outer arm 307 is formed by an elongated pipe 367. The distal end of pipe 367 has a bent portion 361. Bent portion 361 orients an end effect or E toward the center of riser R to ensure clearance between teleoperated arm assembly 301 and riser R during deployment into, and retraction from, tank T. An outlet 363 extends from bent portion 361.

Shielding 365 secures to the outer surface of pipe 367. Shielding 365 protects any external hoses or cabling required to perform a task within tank T by passing the hoses or cabling between shielding 365 and pipe 367. Shielding 337 prevents interference between the hoses or cabling with the joints of the teleoperated arm assembly 301 and protects the external hoses or cabling while teleoperated arm assembly 301 is stowed.

Figure 11:
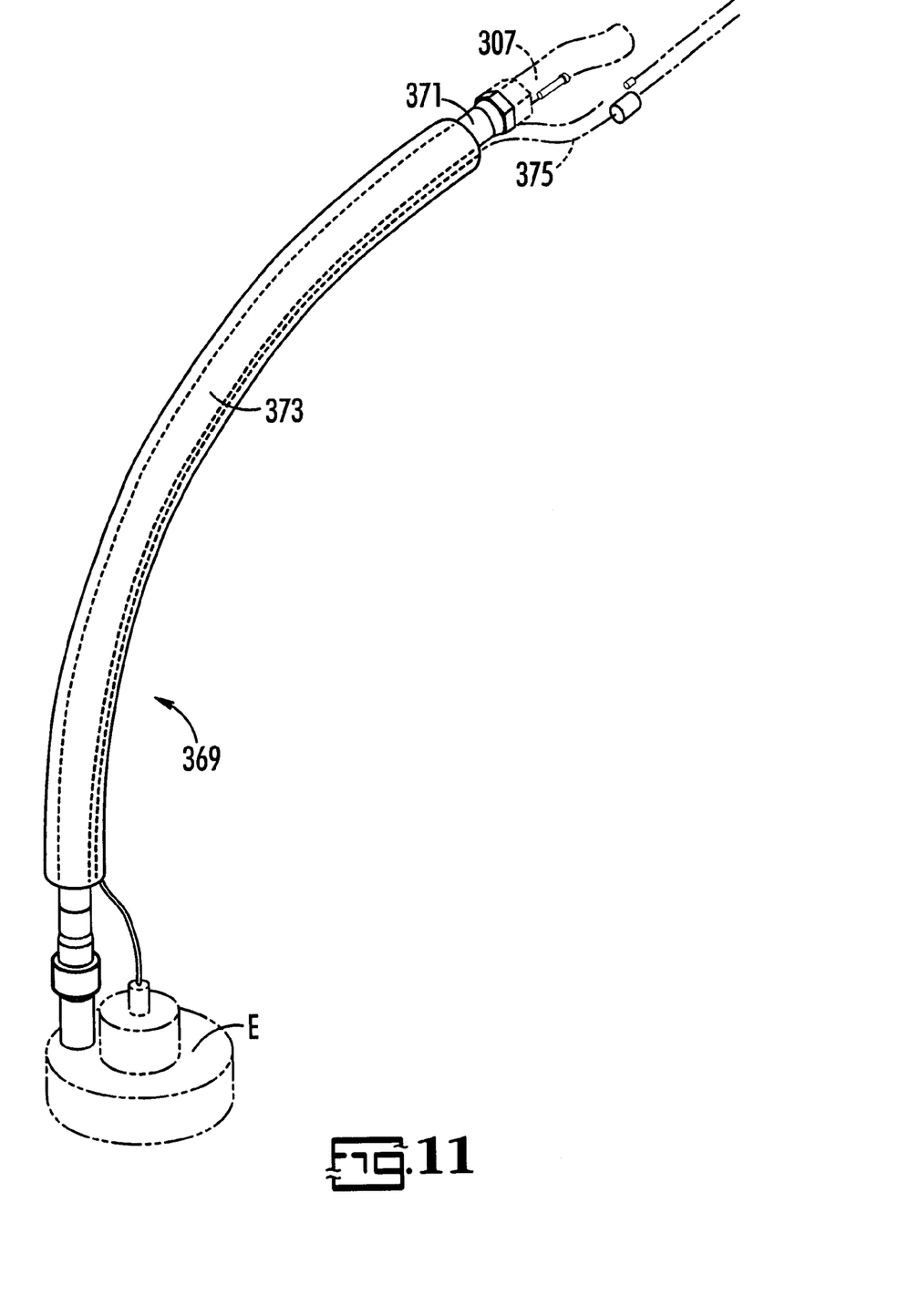
FIG. 11 is a perspective view of an additional conduit section and an end effect or connectable to the outer of the teleoperated arm assembly of the present invention.

Particular tasks within tank T may require teleoperated arm assembly 301 to use an additional conduit section 369. Section 369 includes an additional pipe section 371, preferably a flexible, yet rigid, suction hose. A sheath 373 surrounds pipe 371 and a hose bundle 375 required to operate an end effector E.

With the particular end effector E shown in FIG. 11, hose bundle 375 could include a high pressure water supply, a compressed air supply, motor power cables and feedback cables. End effector E directs the high pressure water at a location in tank T to perform a specific task, such as slurifying. Movement of end effector E within tank T may be accomplished by a different apparatus of system S inserted into tank T through a different riser R. The specific end effector E used with the present invention is not relevant. Any end effector E that can perform a task within tank T could be used by the present invention.

Pipe 371 suctions the slurry. The slurry travels through teleoperated arm assembly 301 and arrives within confinement box assembly 101 for discharge from port 163 and into the discharge process piping (not shown) of system S. Apparatus 1 can accommodate specific types of end effector to perform a task within tank T.

System S can use a jet pump 387 to suction the slurry from end effector E and to propel the slurry through suction line 385 and into the discharge process piping connected to port 163. To route the slurry into the discharge process piping, suction line 385 connects to discharge pipe 167 in confinement box assembly 101 and to conduits 333, 367, 371 of inner arm 305, outer arm 307 and additional conduit section 369, respectively.

Jet pump 387 uses no moving parts. A high pressure water line 389 connects to jet pump 387. Jet pump 387 directs the water from line 389 through nozzles, or jets (not shown), in the interior of jet pump 387. The jets propel the water upwardly through line 385 towards port 163. The venturi effect caused by the upward movement of the water creates a suction within the portion of conduit 385 located upstream of jet pump 387 and within conduits 333, 367, 371. The suction draws the slurry towards jet pump 387. Once the slurry reaches jet pump 387, the velocity of the water exiting the jets propels the slurry through the remainder of line 385 and towards port 163. Control system 401 can control jet pump 387, as with any of the other components of system S.

Although a jet pump has been described herein, the present invention can be used with different types of known pumps, or, if suction is not required to achieve a task within tank T, without a pump entirely.

System S can also include a pressure relief element, such as, for example, a conventional rupture disc assembly 391 connected to suction line 385. When system S reaches a predetermined dangerous pressure within line 385, rupture disc assembly 391 fractures. Once ruptured, assembly 391 reroutes the slurry through return line 393. This prevents possible contamination of the outside environment caused by a dangerous pressure at port 163. Return line 393 retains the slurry within the sealed environment, preferably dispensing the slurry back into tank T.

Control System

Figure 12:
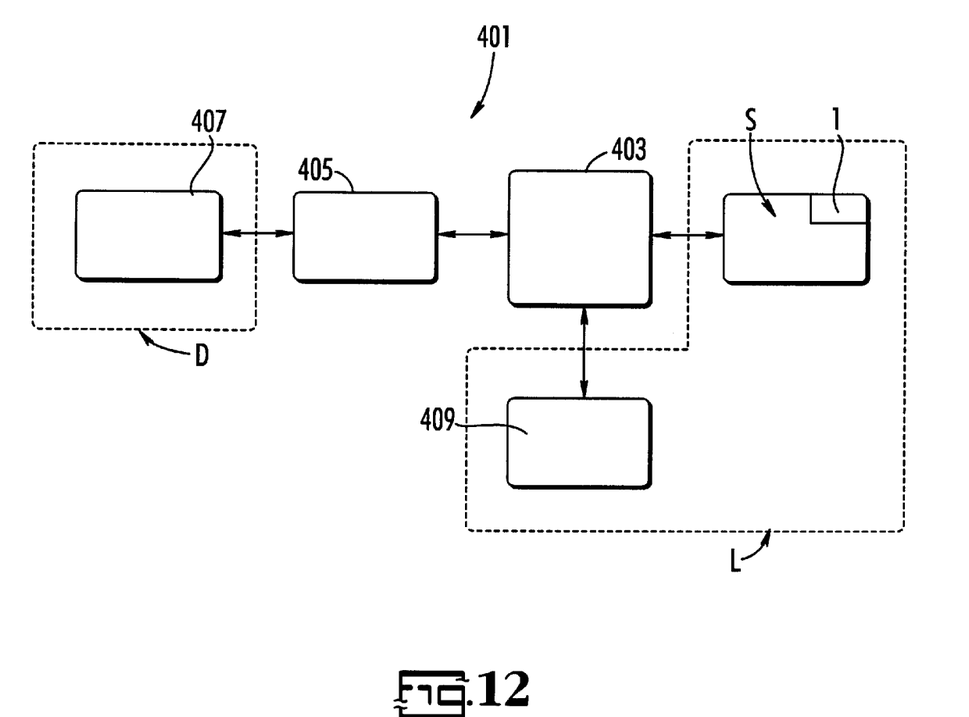
FIG. 12 is a schematic of the control system of the apparatus of the present invention.

FIG. 12 demonstrates a preferred embodiment of control system 401. Preferably, the operator conducts operations at a distant location D, remote from the site of tank T. This prevents exposure of the operator to hazardous conditions during operations of system S, including apparatus 1, in tank T. When desired, however, the operator can conduct operations at a local location L near tank T.

As seen in FIG. 12, apparatus 1 is part of an overall system S used in performing a task in tank T. System S includes, for example, the pipes (not shown), hoses (not shown), cables (not shown) and valves (not shown) to supply the necessary materials and utilities to apparatus 1 and, possibly, other apparatuses in order to perform a task in tank T, and to remove the byproducts that may have been created during performance of the task in tank T.

Preferably, the operator remotely controls system S, including the teleoperation of arm assembly 301, in non-real time using a computer system 407 remote from the site of tank T. Computer system 407 can be a microcomputer, such as a Sun workstation utilizing two monitors. One monitor preferably displays the status of teleoperated am assembly 301, while the other displays the processes of system S. Computer system 407 preferably utilizes a graphical user interface (GUI) to communicate with and to receive commands from the operator.

Computer system 407 interacts with software control logic 405 through a network communication protocol, such as Real Time Innovation's (RTI's) Network Data Delivery System (NDDS). Software control logic 405 performs real-time servo control of teleoperated arm assembly 301 and non-real-time control of the processes of system S via the hardware interface and control logic 403. In other words, software control logic 405 can selectively signal mast rotate motor 141, mast elevate motor 147, shoulder hoist 327 and elbow yaw motor 341 to position teleoperated arm assembly at a desired position within tank T and simultaneously signal process control actuators and valves of system S, including those with apparatus 1, to control process variables in accomplishing a given task within tank T.

Software control logic 405 uses, for example, a Motorola MVME-162 CPU and a VME Microsystems International Corporation (VMIC) VMIVME 5787, Pentium-based PC. The MVMB-162 runs applications developed using RTI's ControlShell® and run in the ControlShell® environment under Wind River System's VxWorks® real-time operating system. The VMIVME 5787 applications were developed and run using Microsoft's Visual C++ and VMIC's IOWorks® under a Windows NT® operating system. The computers communicate via shared memory and reside together with all of their associated memory devices and I/O boards in the same VME rack.

Software control logic 405 interacts with hardware control logic 403 which provides field connections (not shown) from the computer I/O to the various system hardware. Hardware control logic 403 includes conventional interlocks (not shown) which enable the operator to operate safely from the local control panels 409.

Local control panels 409 allow an operator to manage system S, including apparatus 1, at local location L. Preferably, local control panels 409 use manual controls, such as valves (not shown) and electrical control pendants (not shown). Local control panels 409 allow the operator to control system S, including apparatus 1, in the event of a computer failure. Preferably, each control panel is used to perform a specific operation within system S. For example, one control panel 409 can operate hoist assembly 327, another can control the process pumps, another can control the arm joints, while yet another controls mast elevate table 155.

Control system 401 includes a switch (not shown) to transfer control of system S between remote computer 407 and local control panel 409. Even when the switch has transferred control of system S to a different location, each operator station (ie. remote computer 407 and local control panel 409) can monitor system S. Each operator station also includes a kill switch (not shown) to shut down system S in an orderly fashion. The kill switches operate at each control panel irrespective of the position of the control transfer switch. In other words, an operator at local control panel 409 can shut down system S even remote computer 407 has control of system S.

Control system 401 integrates the management of apparatus 1, especially teleoperated arm assembly 301, with the management of the processes of system S into a single operator station. For example, an operator at remote computer 407 can position teleoperated arm assembly 301 within tank T and can initiate the process steps (such as actuating valves and operating pumps) required to perform a given task within tank T. Control system 401 receives the operators commands from remote computer 407 and directs either apparatus 1 and/or system S using software control logic 405 and hardware control logic 403.

The assembly and operation of apparatus 1 will now be described. Preferably, apparatus 1 begins as unassembled components. First, confinement box assembly 101 must be secured to riser R of tank T, or to a decontamination ring (not shown) connected to riser R of tank T. Preferably, lower frame members 119 rest on the steel beams (shown in phantom in FIG. 1).

Since confinement box assembly 101 is large and difficult to precisely position on the steel beams around riser R, the operator manually operates X-Y positioning table 117 to position confinement box assembly 101 directly over riser R. Specifically, the operator aligns pipes 107, 111 with the center of riser R.

Tube assembly 201, with teleoperated arm assembly 301 stored therein in its retracted position, is then secured to the top of confinement box assembly 101. Specifically, flange 205 mates with flange 113. Apparatus 1 is now properly secured to tank T to prevent migration of the hazardous environment outside of tank T.

Locally, teleoperated arm assembly 301 is deployed to its operational readiness position and is secured to mast elevate table 155. Specifically, flange 309 mates with flange 129 of confinement box assembly 101.

Using glove porting 153, 161, the operator then connects the outside piping/hoses and cabling (not shown) to the piping/hoses and cabling within apparatus 1 through conduit interaction compartment 159. The operator connects the conduits from the jumper (not shown) to couplings 315 on circular plate 309. Apparatus 1 is now ready to perform a given task within tank T.

The operator, preferably located at distant location D, monitors and/or controls the processes involved in the operation of system S, and the operations of apparatus 1, using the GUI of computer system 407. If needed, the operator can manually command system S at local location L using control panel 409. The specific sequence of the process steps used with system S can either be controlled using software, or can be controlled by the operator.

To begin operations within tank T, the operator maneuvers teleoperated arm assembly 301 from its retracted position to its deployed position partially within tank T. In order to perform tasks on outer walls W of tank T, the operator must unfold teleoperated arm assembly 301 by pitching the shoulder joint and yawing the elbow joint.

To initiate the process steps, the operator sends commands to control system 401 by remote computer 407. For example, the operator may direct control system 401 to open certain valves and to operate certain pumps to achieve a desired result in tank T.

Upon completing the tasks in tank T, the operator sends additional commands to control system 401. For example, control system 401 can turn off certain pumps and can close certain valves. To remove apparatus 1 from tank T, the operator directs control system 401 to fold teleoperated arm assembly 301 and to partially retract teleoperated arm assembly 301 from tank T.

The operator disconnects all hose and cabling jumper connectors within confinement box assembly 101. Locally, teleoperated arm assembly 301 is fully retracted into tube assembly 201 using hoist assembly 213 by connecting the hoist cable hook (not shown) to eye bolt 313. Once removed from tank T, the operator can decontaminate teleoperated arm assembly 301 using a spray wand (not shown) located in confinement box assembly 101.

Apparatus 1 is disassembled in the reverse order of the assembly process. Disassembly can begin, for example, once the operator performs suitable decontamination protocols and ensures that no hazardous materials will escape into the environment.

Applicants understand that many other variations are apparent to one of ordinary skill in the art from a reading of the above specification. Such variations are within the spirit and scope of the instant invention as defined by the following appended claims.

We claim:

1. An apparatus for performing a task in a confined space having an access port, said apparatus comprising:
    a confinement box securable to the access port of the confined space and having a height adjustable table therein;
    a shell extending from said confinement box;
    a teleoperated arm movable between a retracted position, in which said teleoperated arm is disposed within said shell, and a deployed position in which said teleoperated arm extends through the access port and into the confined space to perform the task, and wherein said teleoperated arm secures to said height adjustable table in the deployed position in order to translate said teleoperated arm, and
    a control system for commanding said teleoperated arm.

2. The apparatus for performing a task in a confined space as recited in claim 1, wherein said teleoperated arm comprises:
    a first section;
    a means for translating said first section;
    a means for rotating said first section;
    a second section;
    a shoulder joint connecting said first and second sections;
    a means for actuating said shoulder joint;
    a third section;
    an elbow joint connecting said second and third sections; and
    a means for actuating said elbow joint.

3. The apparatus for performing a task in a confined space as recited in claim 2, wherein said second and third sections comprise conduits.

4. The teleoperated arm assembly as recited in claim 2, wherein said means for actuating said shoulder joint is a means for pitching said second section relative to said first section.

5. The teleoperated arm assembly as recited in claim 4, wherein said means for pitching said second section comprises a hoist attached to said first section and operatively connected to said second section.

6. The teleoperated arm assembly as recited in claim 2, wherein said means for actuating said elbow joint is a means for yawing said third section relative to said second section.

7. The teleoperated arm assembly as recited in claim 2, wherein at least one of said means for rotating said first section and said means for actuating said elbow joint are backdriveable.

8. The teleoperated arm assembly as recited in claim 2, wherein at least one of said means for translating said first section and said means for actuating said shoulder joint are non-backdriveable.

9. The apparatus for performing a task in a confined space as recited in claim 1, wherein said tube includes a hoist to move said teleoperated arm between said retracted position and said deployed position.

10. The apparatus for performing a task in a confined space as recited in claim 1, wherein said teleoperated arm has four degrees of freedom.

11. An apparatus for performing a task in a confined space having an access port, said apparatus comprising:
    a confinement box having:
        an aperture at an upper end; and
        an aperture at a lower end securable to the access port of the confined space;
    a height adjustable table including:

a motor for raising and lower said table;
a rotatable flange, and
a motor for rotating said flange;
an elongated tube connected to said aperture in said upper end of said confinement box;
a teleoperated arm including:
a mast movable within said tube and said confinement box, said mast secured to said rotatable flange and having at least one conduit extending therethrough;
an inner arm comprising a conduit;
a shoulder joint connecting said mast and said inner arm, said inner arm in fluid communication with said at least one conduit;
a means for actuating said shoulder joint;
an outer arm comprising a conduit;
an elbow joint connecting said outer arm and said inner arm, said outer arm in fluid communication with said inner arm; and
a means for actuating said elbow joint; and
a control system operatively connected to said confinement box and said teleoperated arm for commanding the apparatus.

12. The apparatus for performing a task in a confined space as recited in claim 11, wherein at least one of said flange rotate motor and said means for actuating said elbow joint are backdriveable.

13. The apparatus for performing a task in a confined space as recited in claim 11, wherein at least one of said table motor and said means for actuating said shoulder joint are non-backdriveable.

14. The apparatus for performing a task in a confined space as recited in claim 11, wherein said mast includes a pair of conduits extending therethrough, and further comprises a pump connected to said pair of conduits so that said pump provides a positive pressure to one of said pair of conduits and provides a negative pressure to the other of said pair of conduits.

15. An apparatus for performing a task in a confined space having an access port, said apparatus comprising:
a confinement box securable to the access port of the confined space and having a rotatable flange therein;
a shell extending from said confinement box;
a teleoperated arm movable between a retracted position, in which said teleoperated arm is disposed within said shell, and a deployed position in which said teleoperated arm extends through the access port and into the confined space to perform the task, and wherein said teleoperated arm secures to said flange in a deployed position in order to rotate said teleoperated arm, and
a control system for commanding said teleoperated arm.

16. The apparatus for performing a task in a confined space as recited in claim 15 wherein said teleoperated arm comprises:
a first section;
a means for translating said first section;
a means for rotating said first section;
a second section;
a shoulder joint connecting said first and second sections;
a means for actuating said shoulder joint;
a third section;
an elbow joint connecting said second and third sections; and
a means for actuating said elbow join.

17. The apparatus for performing a task in a confined space as recited in claim 16 wherein said second and third sections comprise conduits.

18. The teleoperated arm assembly as recited in claim 16 wherein said means for actuating said shoulder joint is a means for pitching said second section relative to said first section.

19. The teleoperated arm assembly as recited in claim 18 wherein said means for pitching said second section comprises a hoist attached to said first section and operatively connected to said second section.

20. The teleoperated arm assembly as recited in claim 16 wherein said means for actuating said elbow joint is a means for yawing said third section relative to said second section.

21. The teleoperated arm assembly as recited in claim 16, wherein at least on of said means for rotating said first section and said means for actuating said elbow joint are backdriveable.

22. The teleoperated arm assembly as recited in claim 16 wherein at least one of said means for translating said first section and said means for actuating said shoulder joint are non-backdriveable.

23. The apparatus for performing a task in a confined space as recited in claim 15, wherein said tube includes a hoist to move said teleoperated arm between said retracted position and said deployed position.

24. The apparatus for performing a task in a confined space as recited in claim 15 wherein said teleoperated arm has four degrees of freedom.

* * * * *